US007177795B1

(12) United States Patent
Chen et al.

(10) Patent No.: US 7,177,795 B1
(45) Date of Patent: Feb. 13, 2007

(54) METHODS AND APPARATUS FOR SEMANTIC UNIT BASED AUTOMATIC INDEXING AND SEARCHING IN DATA ARCHIVE SYSTEMS

(75) Inventors: Chengjun Julian Chen, White Plains, NY (US); Dimitri Kanevsky, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/437,971

(22) Filed: Nov. 10, 1999

(51) Int. Cl.
*G06F 17/27* (2006.01)

(52) U.S. Cl. ............... 704/9; 704/10; 704/1; 704/231; 704/251

(58) Field of Classification Search ............ 707/536, 707/535, 533; 704/7, 8, 9, 235, 2, 10, 231, 704/251
See application file for complete search history.

(56) References Cited

U.S. PATENT DOCUMENTS

| | | | |
|---|---|---|---|
| 5,220,639 A * | 6/1993 | Lee | 704/200 |
| 5,649,060 A | 7/1997 | Ellozy et al. | |
| 5,710,591 A * | 1/1998 | Bruno et al. | 348/15 |
| 5,778,361 A * | 7/1998 | Nanjo et al. | 707/5 |
| 5,794,249 A | 8/1998 | Orsolini et al. | |
| 6,166,733 A * | 12/2000 | Yamada | 345/776 |

OTHER PUBLICATIONS

Lee et al., Syllable-Based Relevence Feedback Techniques for Mandarin Voice Record Retrieval Using Speech Queries, 1997, IEEE, pp. 1459-1462.*

Ferrieux et al., Phoneme-Level Indexing for Fast and Vocabulary-Independent Voice/Voice Retrieval, Apr. 1999, ESCA ETRW workshop Accessing information in spoken audio, Cambridge, pp. 1-4.*

Chang et al., Improved syllable-based continuous Mandarin speech recognition using intersyllable boundary models, 25th May 1995, Electronic Letters, vol. 31 No. 11, pp. 853-854.*

* cited by examiner

*Primary Examiner*—Richemond Dorvil
*Assistant Examiner*—Lamont Spooner
(74) *Attorney, Agent, or Firm*—Anne V. Dougherty; Ryan, Mason & Lewis, LLP

(57) ABSTRACT

An audio-based data indexing and retrieval system for processing audio-based data associated with a particular language, comprising: (i) memory for storing the audio-based data; (ii) a semantic unit based speech recognition system for generating a textual representation of the audio-based data, the textual representation being in the form of one or more semantic units corresponding to the audio-based data; (iii) an indexing and storage module, operatively coupled to the semantic unit based speech recognition system and the memory, for indexing the one or more semantic units and storing the one or more indexed semantic units; and (iv) a search engine, operatively coupled to the indexing and storage module and the memory, for searching the one or more indexed semantic units for a match with one or more semantic units associated with a user query, and for retrieving the stored audio based data based on the one or more indexed semantic units. The semantic unit may preferably be a syllable or morpheme. Further, the invention is particularly well suited for use with Asian and Slavic languages.

29 Claims, 5 Drawing Sheets

METHODS AND APPARATUS FOR SEMANTIC UNIT BASED AUTOMATIC INDEXING AND SEARCHING IN DATA ARCHIVE SYSTEMS

FIELD OF THE INVENTION

The present invention generally relates to data archive systems and, more particularly, to improved indexing and searching methods and apparatus for use in such systems.

BACKGROUND OF THE INVENTION

Several patents and patent applications deal with audio-indexing and searching of audio data, e.g., U.S. Pat. No. 5,649,060 issued to Ellozy et al. on Jul. 15, 1997; U.S. Pat. No. 5,794,249 issued to Orsolini et al. on Aug. 11, 1998; and U.S. patent application identified by Ser. No. 09/108,544, entitled: "Audio-Video Archive and Method for Automatic Indexing and Searching," filed on Jul. 1, 1998, the disclosures of which are incorporated by reference herein. All of the approaches taken in these patents and the patent application use a word as a basic unit for indexing and search. Typically in these methods, audio data is transcribed (via automatic speech recognition or manually), time stamped and indexed via words.

In a word-based system, before the searching can be started, a vocabulary and a language model based on known words must be prepared. Thus, by definition, there are always words that are unknown to the system. Unfortunately, the searching mechanism can only work with words resulting in a good language model score, i.e., known words.

In an attempt to create a system capable of searching using an entry which is unknown to the system, phone-based indexing methods have been proposed. This method includes generating an acoustic transcription for words and indexing speech segments via acoustic phones. However, these phone-based indexing methods are not very efficient since there can be different phonetic descriptions for the same word and the phonetic recognition accuracy can be low, e.g., lower than a word recognition accuracy.

These difficulties are even more apparent in a system operating in a language for which the unit "word" in speech and text may be ambiguous, e.g., the Chinese language, or in a language that has a very large number of word forms, e.g., Slavic languages.

For most European languages, word boundaries exist in printed text, as well as in computer text files. These boundaries are represented as blank spaces between words. However, for most of the Asian languages, including, e.g., Chinese, Japanese, Korean, Thai, and Vietnamese, such word boundaries neither exist in printed form, nor in computer text files. Thus, word-based indexing and searching methods can not be applied to these languages. Phone-based indexing and searching methods for these languages have similar problems as those mentioned above.

Thus, a need exists for methods and apparatus for indexing and searching audio data, and the like, which minimizes and/or eliminates these and other deficiencies and limitations, and which may be used with a greater number of languages.

SUMMARY OF THE INVENTION

The present invention provides for improved indexing and searching of audio data, and the like, using minimal semantic unit based methodologies and/or apparatus. It is to be appreciated that "minimal semantic units" are defined as small, preferably the smallest, units of a language that are known to have semantic meaning. Examples of semantic units that may be used are syllables or morphemes. Such an inventive approach may be used in conjunction with languages which have difficulty being adapted for use with existing approaches, e.g., Asian languages.

It is to be appreciated that a "morpheme" is a minimal semantic unit in a language that is recurrent and meaningful. It may be a part of a word, or a word, such as the three units in the word "friendliness," that is "friend-," "li-," and "ness." In Western languages, there is a distinction between a free morpheme and a bound morpheme. A free morpheme can be a standalone word, such as "friend." A bound morpheme cannot be used by itself, such as "li" and "ness." A morpheme can be a single syllable, a group of syllables, or a consonant attached to a syllable, such as the "s" in "man's shirt." In most East Asian languages, since there is no word boundaries in printed text or in computer files, the distinction between free morpheme and bound morpheme is not explicit. In those languages, a morpheme is a more adequate unit of language than a word.

Further, it is to be appreciated that a "syllable" is a group of phonemes comprising a vowel or continuant, alone or combined with a consonant or consonants, representing a complete articulation or a complex of articulations, and comprising the unit of word formation. It is identifiable with a chest pulse, and with a crest of sonority. A syllable can be open if it ends with a vowel, or closed if it ends with a consonant. In the above example, "friend," "li," and "ness," are three syllables, with "li" open, and "friend" and "ness" closed.

The semantic unit known as a morpheme exists in many Asian languages. For example, in many East Asian languages, such as Chinese, Thai, Vietnamese, with a few exceptions, almost all morphemes are monosyllabic. Thus, in those languages, the concept of morpheme and syllable are interchangeable.

Also, in Chinese, each syllable is represented by a character, a so-called Hanzi. The number of syllables and the number of Hanzi are finite. In modern standard spoken Chinese, Mandarin, the total number of different syllables is 1,400. In modern standard written Chinese, the number of commonly used characters is 6,700 in mainland Chinese, and 13,000 in Taiwan.

Accordingly, in a broad aspect of the present invention, methods and apparatus are provided for indexing and searching of audio data, and the like, which are based on minimal semantic units such as, for example, syllables and/or morphemes. In this manner, such inventive methods and apparatus for indexing and searching audio data, and the like, minimize and/or eliminate deficiencies and limitations associated with existing indexing and searching systems (e.g., word-based systems). Further, such inventive methods and apparatus for indexing and searching audio data, and the like, may be used with a greater number of languages.

Thus, in one exemplary embodiment of the invention for Chinese language, a searching engine may be provided which is based on characters, or Hanzi. A statistical language model built upon a large text corpus is used to execute speech recognition. The sought-after information (data to be searched) is formatted in terms of one character, or a sequence of characters. The searching mechanism compares the text with the target.

In another exemplary embodiment of the invention for Chinese language, a searching engine may be provided which is based on phonetic syllables. A statistical language model based on phonetic syllables is built from a large text corpus, by converting the characters into phonetic syllables. The size of the language model is much smaller. The sought-after information is formatted in terms of one phonetic syllable, or a sequence of phonetic syllables.

Observing the fact that syllables in Chinese bear semantic information, we generalize syllable based audio-indexing as follows. The present invention employs a semantic unit that is typically smaller than a word and has a unique acoustic representation. Semantic units allow to build language models that represent semantic information and improve the decoding accuracy of automatic speech recognition (ASR) that is based on a vocabulary comprised of semantic units. As mentioned, examples of such units are a syllable (e.g., in Chinese language) or a morpheme (e.g., in Slavic languages) for transcription of audio data, indexing and search. This methodology is generally applicable to most languages since the unit syllable is clear, and the number of possible syllables in a language is finite. For those languages, to use the unit syllable as the basic building block of searching is more efficient. This approach also resolves the above-mentioned problem of unknown words, since a system employing the methodology knows all syllables that may be used in its applicable language.

For example, such languages that may be supported by this inventive approach may include, but are not limited to:

a) Chinese. In the standard dialect (Mandarin, or Putonghua, based on Beijing dialect), the total number of allowed acoustic syllables is less than 1,800. The rate of syllables of average speech is 4–5 syllables per second.

b) Korean. There are less then 2,400 acoustically allowed syllables. The writing system is totally based on acoustic syllables. The rate of syllables of average speech is 4–5 syllables per second.

c) Japanese. There are only 105 acoustically allowed syllables. The rate of syllables of average speech is 6–7 syllables per second.

d) Vietnamese. There are 3,000 different syllables. The writing system is totally based on acoustic syllables. The rate of syllables of average speech is 4–5 syllables per second.

Similarly, languages that have a very large number of word forms (like several million word forms in Slavic languages) have a relatively small number of morphemes (e.g., 50,000 morphemes in Russian language). For those languages, an automatic speech recognition system returns a string of acoustic syllables or morphemes. This can be done with a language model based on acoustic syllables or morphemes. The word to be searched is first rendered into a string of syllables. Those syllable strings are then matched against the decoded acoustic syllable database.

It is to be appreciated that the methodologies of the present invention are more straightforward and faster than the word or word-tag based method. Data compression is also more efficient due to the finite number of syllables and morphemes.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

The present invention will be explained below in the context of an illustrative syllable based indexing and searching implementation. However, it is to be understood that the present invention is not limited to such a particular implementation. Rather, the invention is more generally applicable to indexing and searching of audio data using semantic units, syllables being just one example of a semantic unit. For example, the invention advantageously finds application in any implementation where it is desirable to provide audio based data indexing and searching capabilities to a user such that the user does not need to be concerned with entering unknown words in his query to the system. The invention is particularly suitable for use with such languages as mentioned above, e.g., Asian and Slavic languages. However, the invention is not limited to use with any particular language.

Figure 1:
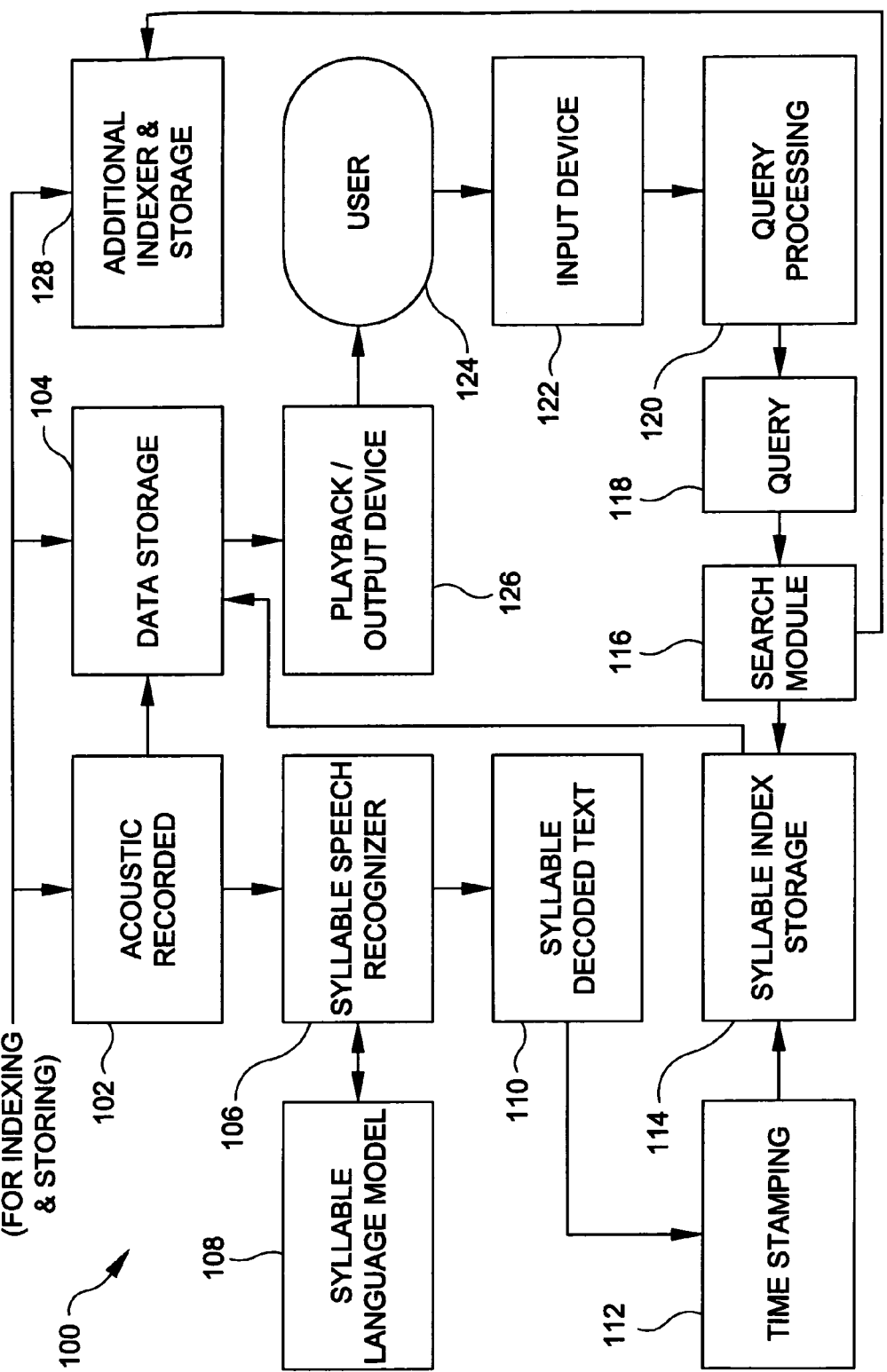
FIG. 1 is a block diagram of an apparatus for indexing and searching an audio recording via syllables according to an embodiment of the present invention.

Referring now to FIG. 1, apparatus for indexing and searching an audio recording via syllables according to an embodiment of the present invention is shown. The apparatus 100 operates in the following manner. Audio data is recorded by an acoustic recorder unit 102. The audio data is stored in data storage 104. The audio data is also processed by a syllable speech recognizer 106. An example of a speech recognizer that may be employed by the invention is described in C. J. Chen et al., "A Continuous Speaker-Independent Putonghua Dictation System," 3rd International Conference on Signal Processing Proceedings, pp. 821–824, 1996, the disclosure of which is incorporated herein by reference. A standard speech recognition system, such as that described in the above-referenced Chen et al. article, can be adapted to use a syllable based language model 108, the generation of which will be explained below, to provide the functions of the syllable speech recognizer 106. Given a syllable based language model according to the invention and given the fact that such a model is generally simpler than a word based language model in a standard speech recognition system, one of ordinary skill in the art will appreciate how to adapt a standard speech recognition system to operate as a syllable speech recognizer 106 using a syllable based language model 108.

It is to be appreciated that, in one embodiment of the invention, syllables may be phonetically based. Phonetic syllables reflect different pronunciations of syllables. In Chinese, phonetic syllables vary in different parts of the country (despite the fact that a textual representation does not depend on a geographical location). In another embodiment of the invention, phonetic syllables comprise "tonemes" that reflect phonetic and intonation information, see the above-referenced Chen et al. article. A toneme is an intonation phoneme in a tone language.

The syllable speech recognizer 106 using the syllable based language model 108, in a similar manner as a standard speech recognition system uses a word based language model, produces a decoded text (i.e., transcription) that is comprised of syllables 110. This syllable textual is time stamped, as will be explained, in unit 112 and stored with syllable indexes in a syllable index storage unit 114. The syllable index storage unit 114 contains indexes, e.g., time stamps, associated with the decoded syllable data. These time stamps, as is explained in the example below, are used to retrieve the corresponding audio data in the audio data storage 104 in response to a search query.

For example, in one preferred embodiment, an index stored in unit 114 contains the address where the data for a syllable can be found in data storage 104. It is to be appreciated that some syllables may occur several times during the recording of the audio data by the acoustic recorder 102. The data from the recorder is stored in unit 104. An index in unit 114 points to where a particular syllable is stored in the unit 104. One simple way to indicate where the syllable is stored is to indicate times when this syllable was spoken. Thus, the index can be related to a set of times when the syllable was spoken. This is accomplished via the time stamping of the syllables by unit 112. The conversion of time in the storage address allows to retrieve all locations where the data related to the syllable in 104 is stored.

By way of a simple example, assume that a sentence decoded by the syllable speech recognizer 106 contains a sequence of syllables that are aligned to an audio (stored in unit 104) sentence whereby the sequence of syllables is represented as: S1, S2, S3, S4, S1, S4, S1, S2, S7, S8, S7. These syllables have been time stamped for times: t1–t2, t3–t4, t5–t6, tm–tn. Assume the audio sentence is represented as audio segments: aud1, aud2, aud3, aud4, aud5, aud6, aud7, aud8, aud9, aud10, aud11. Thus, the index data stored in unit 114 may be as follows: S1: aud1, aud5, aud7; S2: aud2, aud8; S3: aud3; S4: aud4, aud6; S7: aud9, aud11; S8: aud10. This means that a syllable S1 is stored in 1st, 5th and 7th places (segments) in the audio sentence that is stored in the data storage 104. Therefore, to play segments that correspond to S1, one can go to corresponding locations in data storage 104 that are indicated in the index.

It is to be appreciated that while time stamping is a convenient way to index the decoded data, any other applicable indexing technique may be employed. The above process generally comprises the data indexing process according to this particular embodiment of the invention.

The syllable index storage unit 114 is connected to a syllable based search device 116. Any conventional search methodology may be employed by the search device. The syllable search device 116 receives as input queries 118 from a user 124 via input device 122. The input device may, for example, be one of the following: a keyboard; an automatic speech recognition (ASR) system; and automatic handwriting recognition (AHR) system, etc. The syllable query may be processed by query processing module 120, as will be explained, prior to being submitted to the search device. The syllable query 118 is used by the search device 116 to identify audio segments in the data storage 104. This may be accomplished by the audio segments being aligned to textual data. For example, audio data is parameterized by time, and syllables in the sentence are mapped in time intervals in audio data. An example of this was given above with regard to the indexing operation. The technique of aligning of audio data to textual data is performed by the recognizer 106. When the recognizer decodes speech, it associates textual parts (e.g., syllables) to corresponding pieces of audio data.

Thus, a syllable in the users query may be associated with or matched to one or more audio segments stored in audio storage 104 by identifying the index in index storage 114 that corresponds to the syllable in the query. That is, if the user query contains syllable S1, then audio segments aud1, aud5, aud6 are identified based on the indexing operation explained above. Once the audio data segments are identified, they are played back to the user via a playback/output device 126. The device 126 may therefore include a play back speaker. The user query 118 can contain additional information that helps to localize the search.

The above scheme is a simplified example of audio indexing/searching via syllables. That is, depending on the application, additional features can be implemented. Namely, the audio data may be further indexed based on attributes associated with the person who generated the audio data, i.e., the speaker. This may be accomplished in indexer and storage unit 128. That is, attributes associated with the speaker, e.g., name, sex, age, may be extracted from the audio data and used to index and store the audio data provided. These attributes may be expressly spoken by the person (e.g., "My name is . . . ") and decoded by a speech recognizer or determined via conventional speaker recognition techniques. Alternatively, the audio data can be labeled with speaker names in order to enhance the audio search portion of the system. Labeling audio data with speaker names is discussed in the U.S. patent application identified by Ser. No. 09/294,214, entitled "System and Method for Indexing and Querying Audio Archives," filed on Apr. 16, 1999, the disclosure of which is incorporated herein by reference.

Accordingly, for example, the user can restrict a search of a given syllable query to some speakers in a conference. As mentioned, the stored audio data can be also associated with speaker biometrics that provide additional information about speakers (for example, social user status, age, sex, etc.) as is described in the U.S. patent application identified by Ser. No. 09/371,400, entitled "Conversational Data Mining," filed on Aug. 10, 1999, the disclosure of which is incorporated herein by reference.

Stored audio data can also be marked with labels providing some other information. This information can include information when the audio data was produced, places where it was produced, etc. The audio data can also be associated with video data that was recorded simultaneously with the audio data and stored in data storage unit 104. This permits a user to add video related queries to the audio related queries he enters at the input device 122. In this case, the search device may further implement video image recognition searching techniques.

Figure 2:
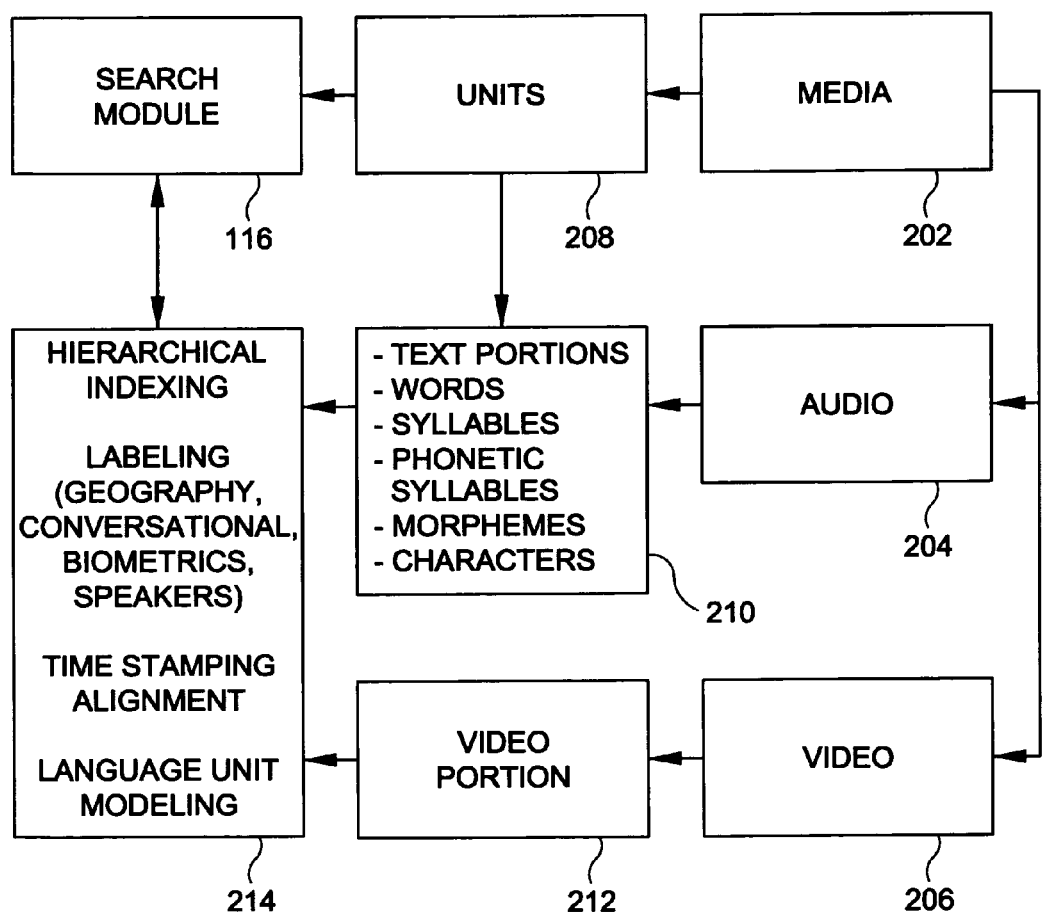
FIG. 2 provides examples of searching queries and media according to an embodiment of the present invention.

It is to be appreciated that one or more of these additional indexing features (e.g., speaker biometrics, video data, etc.) may be implemented in accordance with the apparatus 100 of FIG. 1 in the indexer and storage unit 128. In the case of indexing and storing both audio and video data, the hierarchical index storage and searching techniques as described in the above-incorporated U.S. patent application identified by Ser. No. 09/108,544, entitled "Audio/video Archive and Method for Automatic Indexing and Searching," filed on Jul. 1, 1998. In the hierarchical search, syllable becomes one of the layers in the hierarchical pyramid. As will be explained below, FIG. 2 depicts certain of these additional indexing and searching features which apparatus 100 may implement.

Results of user query search can be represented to the user in various other ways than explained above. For example, in accordance with a playback output device 126 that includes a display, the user can first view a printed decoded (syllable) output and, after viewing the whole decoding output, the user 124 can decide what part of audio data he would like to play back simply by clicking (using a mouse included as part of the input device 122) on this part of textual output. In another embodiment, the user also can view video data that is associated with audio data that was found by the searching device 114 in accordance with query requests.

In yet another embodiment of the invention, the audio data is played back starting from the syllable that was indicated by the user query until the user stops the audio play back (via the input device) or until a particular time duration of the audio segment, as specified in the user query, has expired.

Still further, the user query can also consist of words rather then a set of phonetic syllables. In this case, words are transformed into a sequence of syllables using a text-to-phonetic syllable map. Such a map may be generated in any conventional manner. This text-to-syllable map can employ a table that associates, with each syllable, a set of possible phonetic syllables. This map/table may be implemented by the query processing module 120. In the search mode, the number of phonetic syllables associated with an input textual syllable can be restricted if additional data is provided (for example, geographical location where audio data was produced).

The user query also can contain relatively long textual corpora rather than several words or syllables. The user can have a text of spoken speech (for example, if he himself read some text to record audio data). In this case, a textual corpora is mapped in a string of (phonetic) syllables and a specific search mechanism implemented in the search device 114 can be used to find audio data that match a long string of syllables. This mechanism is described in the above-incorporated U.S. Pat. No. 5,649,060. It allows to match audio data with a reference textual corpora even when relatively low quality ASR is used. It exploits time stamping of a textual corpus and matches a small number of portions in the reference script with portions in the stored decoded output.

The methods that are used for phonetic syllable indexing can be used with other techniques of splitting of words into smaller units, for example, morphemes in Slavic languages.

Referring now to FIG. 2, examples of searching queries and media according to an embodiment of the present invention are depicted. Media for search 202 can contain both audio data 204 and video data 206. The media is split into units 208 used for indexing. It is to be appreciated that this splitting may be done in the query processing module 120. Examples of audio units are depicted in block 210. Such units may include: text portions (e.g., phrases, paragraphs, chapters, poems, stories), words, syllables, phonetic syllables, morphemes, characters, and other semantic units (e.g., roots in Slavic languages). Video data can be split into video portions 212. This can also be done in the query processing module 120, see the above-referenced U.S. patent application identified by Ser. No. 09/108,544, entitled "Audio/video Archive and Method for Automatic Indexing and Searching."

The searching device 116 (same as in FIG. 1), in response to receipt of query units 208 can employ one or more of the features depicted in block 214 to assist or produce a search: (i) hierarchical indexing (e.g., phonetic syllables point to syllables, syllables point to words and words can point to phrases); (ii) labeling used to restrict a search (e.g., location, speaker names, time period etc.); (iii) time stamping helps to index audio data and align it to textual data; and (iv) a language unit model is trained from a string of units (e.g., syllables) and increases the accuracy of mapping audio data into string of units (e.g., syllables).

The search system 116 may also use an automatic boundary marking system that is applied to a query 118. This is used to split the user input into words. Recall that in some languages characters are not separated into words with spaces. This allows searching via words (not only via syllables). Found portions of audio (e.g., that correspond to syllables or words) are played in via unit 126 to the user so that he can decide which portion of audio is needed.

As mentioned, the syllables can point to other hierarchical levels of data (e.g., as described in block 214 of FIG. 2). For example, audio can be accompanied with video and therefore this video data can be shown to the user (e.g., via unit 126) together with audio.

Audio data can be represented with cepstra (i.e., an efficient compressed form of representation of audio). The cepstra can be converted to audio data that can be played to a user. The quality of the audio data obtained from cepstra can be relatively low but may be suitable in some applications, e.g., just to represent a content of the stored phrase. Since cepstra requires less storage capacity than full audio, the search and play back can be performed faster. This cepstra can point to full quality audio that can be used if the user needs a high quality output. Such an interface is further described in the above-incorporated U.S. patent application identified by Ser. No. 09/108,544, entitled "Audio/video Archive and Method for Automatic Indexing and Searching."

In another embodiment, a textual output can also be represented as stenographer transcriptions (i.e., rather than a decoder output). Stenography is similar to a decoder, but textual data is produced by a stenographer and can be more accurate than a decoder output. This stenographer output can be presented to the user 124 via unit 126, if this stenographer output is available. Therefore, a user can point to different places in the stenographer output and they will be played back as audio that is aligned to the stenographer data.

Figure 3:
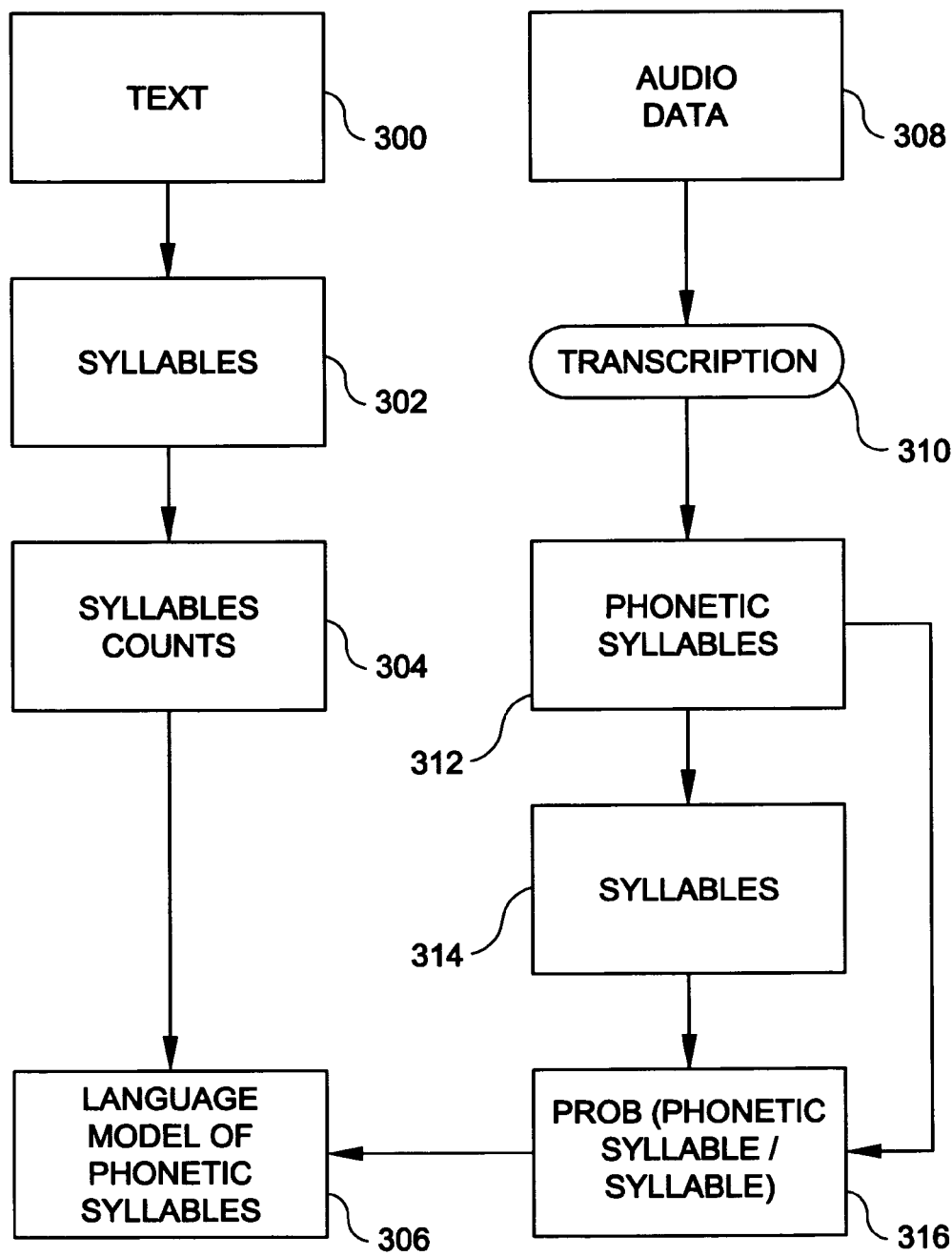
FIG. 3 is a block diagram of production of a syllable language model according to an embodiment of the present invention.

Referring to FIG. 3, a block diagram of a method of producing a syllable language model according to an embodiment of the present invention is shown. This is the syllable language model 108 that may be used by speech recognizer 106 of FIG. 1. Textual corpora 300 is used to produce strings of syllables 302 (e.g., via tables that map strings of characters into syllables). Strings of syllables give rise to syllable counts 304. In order to produce a language model of phonetic syllables 306, it is necessary to know how syllables are pronounced. Since the same syllables can have different pronunciations, this data cannot be extracted directly from a textual corpus. As a result, the audio data 308 corresponding to the text 300 is transcribed (block 310). Transcription 310 may be generated manually or using automatic speech recognition that aligns phonetic syllables to a string of spoken syllables. Phonetic syllables 312 and syllables 314 generated as part of the transcription 310 are then used to derive respective probabilities of distribution of a phonetic syllable given a syllable (block 316). Syllable counts 304 and conditional distributions of phonetic syllables 314 are used to construct the language model of phonetic syllables 306. Given the syllable counts 304 and the conditional distributions of phonetic syllables 314, one of ordinary skill in the art will appreciate how to construct the language model of phonetic syllables 306. For example, the procedure is similar to constructing a language model for classes (e.g., Frederick Jelinek, "Statistical Methods for Speech Recognition," The MIT Press, Cambridge, 1998, the disclosure of which is incorporated herein by reference) or a language model for morphemes (e.g., U.S. Pat. No. 5,835,888 issued Nov. 10, 1998, entitled "Statistical Language Model for Inflected Languages," the disclosure of which is incorporated herein by reference).

Figure 4A:
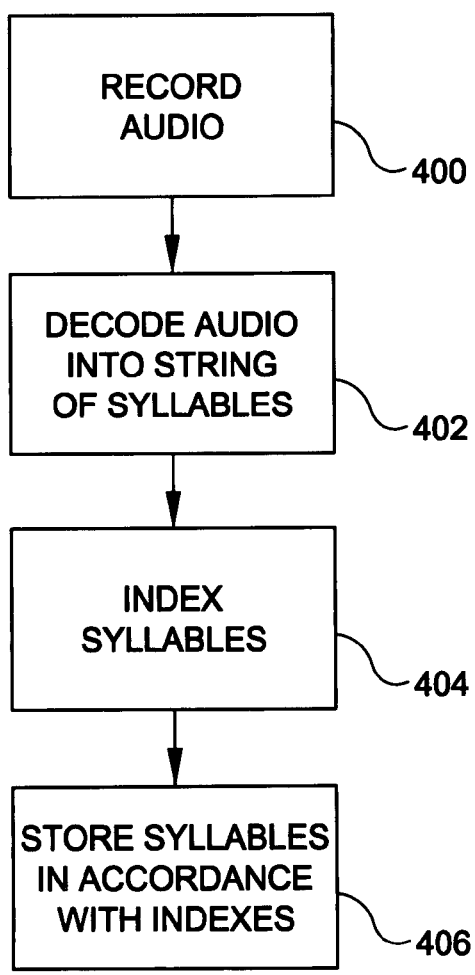
FIG. 4A is a flow chart of a syllable based audio indexing method according to an embodiment of the present invention.

Referring now to FIG. 4A, a flow chart of a syllable based audio indexing method according to an embodiment of the present invention. In step 400, audio data to be indexed and stored is recorded. In step 402, the audio data is decoded into a transcription comprising strings of syllables (or morphemes). In step 404, the syllables are indexed by time stamping the syllables (or morphemes). Lastly, in step 406, the syllables (or morphemes) are stored in accordance with the time stamp indexes.

Figure 4B:
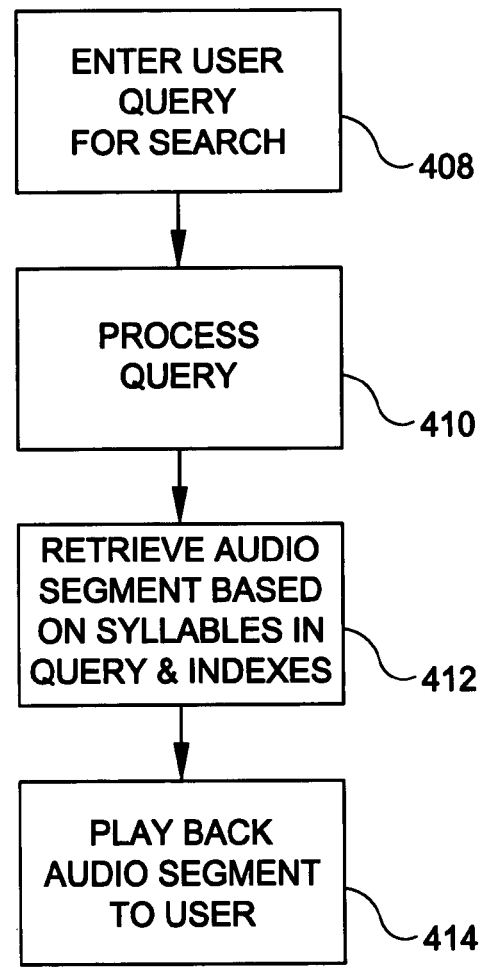
FIG. 4B is a flow chart of a syllable based audio searching method according to an embodiment of the present invention.

Referring now to FIG. 4B, a flow chart of a syllable based audio searching method according to an embodiment of the present invention. It is to be appreciated that the search method of FIG. 4B is preferably employed in connection with data indexed according to the indexing method of FIG. 4A. In step 408, a user enters a query in order to retrieve some portion of the stored acoustic data. The query is processed in step 410. As explained above, this may include transforming words entered by a user into a sequence of syllables using a text-to-phonetic syllable map. The user may also directly enter syllables rather than words. In step 412, the syllables are used to retrieve the desired audio data segments from storage. Lastly, in step 414, the audio segments are played back to the user.

Figure 5:
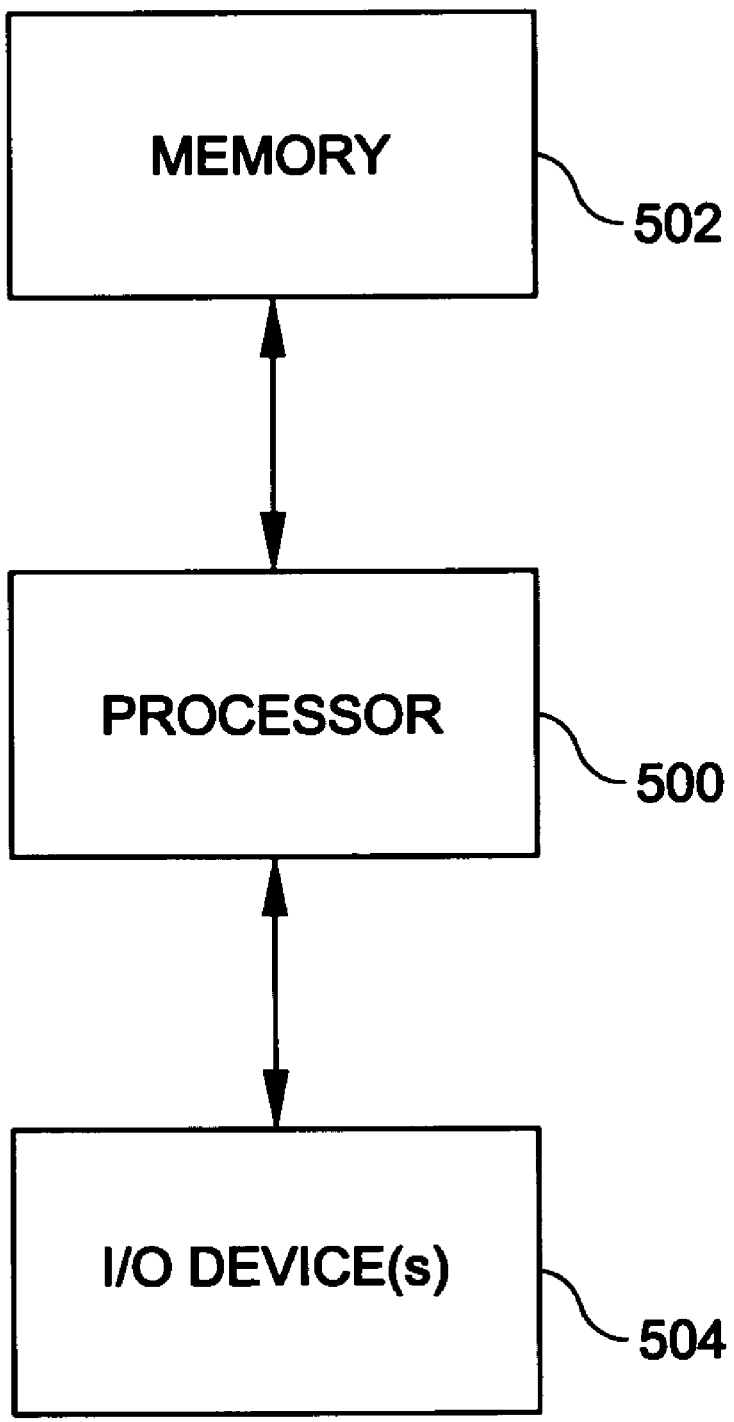
FIG. 5 is a block diagram of a hardware implementation of an audio indexing and searching system according to an embodiment of the present invention.

Referring now to FIG. 5, a block diagram is shown of an exemplary hardware architecture for implementing one, more or all of the elements of the apparatus 100 shown in FIG. 1. In this embodiment, the apparatus 100 may be implemented by a processor 500, memory 502, and I/O devices 504. It is to be appreciated that the term "processor" as used herein is intended to include any processing device, such as, for example, one that includes a CPU (central processing unit). For example, the processor may be a digital signal processor, as is known in the art. Also the term "processor" may refer to one or more individual processors. The term "memory" as used herein is intended to include memory associated with a processor or CPU, such as, for example, RAM, ROM, a fixed memory device (e.g., hard drive), a removable memory device (e.g., diskette), flash memory, etc. In addition, the term "input/output devices" or "I/O devices" as used herein is intended to generally include, for example, one or more input devices, e.g., microphone, keyboard, mouse, etc., for inputting data and other signals to the processing unit, and/or one or more output devices, e.g., display, speaker, etc., for providing results associated with the processing unit. For example, the display or speaker may provide a user with play back information retrieved by the system. Accordingly, computer software including instructions or code for performing the methodologies of the invention, as described herein, may be stored in one or more of the associated memory devices (e.g., ROM, fixed or removable memory) and, when ready to be utilized, loaded in part or in whole (e.g., into RAM) and executed by a CPU. In any case, it should be understood that the elements illustrated in the figures may be implemented in various forms of hardware, software, or combinations thereof, e.g., one or more digital signal processors with associated memory, application specific integrated circuit(s), functional circuitry, one or more appropriately programmed general purpose digital computers with associated memory, etc. Given the teachings of the invention provided herein, one of ordinary skill in the related art will be able to contemplate other implementations of the elements of the invention.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method of processing audio-based data associated with a particular language, the method comprising the steps of:
    storing the audio-based data;
    generating a textual representation of the audio-based data, the textual representation being in the form of one or more semantic units corresponding to the audio-based data, wherein each of at least a portion of the one or more semantic units comprise a sub-unit of a word and not a complete word itself; and
    indexing the one or more semantic units and storing the one or more indexed semantic units for use in searching the stored audio-based data in response to a user query, wherein at least one segment of the stored audio-based data is retrievable by obtaining a location indicative of where the at least one segment is stored from a direct correspondence between at least one of the indexed semantic units and the at least one segment.

2. The method of claim 1, wherein the semantic unit is a syllable.

3. The method of claim 2, wherein the syllable is a phonetically based syllable.

4. The method of claim 3, wherein a phonetically-based syllable comprises a toneme.

5. The method of claim 3, wherein two or more different pronunciations are associated with a phonetically-based syllable.

6. The method of claim 1, wherein the semantic unit is a morpheme.

7. The method of claim 1, wherein the generating step comprises decoding the audio-based data in accordance with a speech recognition system.

8. The method of claim 7, wherein the speech recognition system employs a syllable language model.

9. The method of claim 8, wherein production of the syllable language model comprises the steps of:
    transcribing audio data to generate syllables;
    deriving conditional probabilities of distribution based on the generated syllables; and
    using syllable counts and the conditional probabilities to construct the syllable language model.

10. The method of claim 7, wherein the speech recognition system employs a semantic unit based language model.

11. The method of claim 1, wherein the indexing step comprises time stamping the one or more semantic units.

12. The method of claim 1, wherein the searching step comprises:
    processing the user query to generate one or more semantic units representing the information that the user seeks to retrieve;
    searching the one or more indexed semantic units to find a substantial match with the one or more semantic units associated with the user query; and retrieving one or more segments of the audio-based data using the one or more indexed semantic units that match the one or more semantic units associated with the user query.

13. The method of claim 12, wherein the searching step further comprises presenting the retrieved data to the user.

14. The method of claim 1, wherein the particular language is an Asian based language.

15. The method of claim 14, wherein the particular language is Chinese.

16. The method of claim 15, wherein the semantic unit is a Chinese character.

17. The method of claim 1, wherein the particular language is a Slavic based language.

18. The method of claim 1, wherein the one or more semantic units are indexed according to speaker attributes.

19. The method of claim 1, wherein the one or more semantic units are indexed according to at least one of when the audio based data was produced and where the audio based data was produced.

20. The method of claim 1, further comprising the step of storing video based data associated with the audio based data for use in searching the stored audio based data and the video based data in response to a user query.

21. The method of claim 20, wherein the searching step includes a hierarchical search routine.

22. The method of claim 1, wherein the generating step comprises stenographically transcribing the audio-based data to generate the textual representation.

23. The method of claim 1, wherein the user query comprises a word.

24. The method of claim 23, wherein the searching step further comprises transforming the word into a sequence of syllables using a text-to-phonetic syllable map.

25. The method of claim 1, wherein the generating step comprises producing the textual representation via stenography.

26. The method of claim 1, wherein the searching step comprises use of a hierarchical index.

27. The method of claim 1, wherein the searching step comprises use of an automatic boundary marking system.

28. Apparatus for processing audio-based data associated with a particular language, the apparatus comprising:
a memory; and
at least one processor coupled to the memory and operative to: (i) store the audio-based data in the memory; (ii) generate a textual representation of the audio-based data, the textual representation being in the form of one or more semantic units corresponding to the audio-based data, wherein each of at least a portion of the one or more semantic units comprise a sub-unit of a word and not a complete word itself; and (iii) index the one or more semantic units and store the one or more indexed semantic units for use in searching the stored audio-based data in response to a user query, wherein at least one segment of the stored audio-based data is retrievable by obtaining a location indicative of where the at least one segment is stored from a direct correspondence between at least one of the indexed semantic units and the at least one segment.

29. An audio-based data indexing and retrieval system for processing audio-based data associated with a particular language, the system comprising:
memory for storing the audio-based data;
a semantic unit based speech recognition system for generating a textual representation of the audio-based data, the textual representation being in the form of one or more semantic units corresponding to the audio-based data, wherein each of at least a portion of the one or more semantic units comprise a sub-unit of a word and not a complete word itself;
an indexing and storage module, operatively coupled to the semantic unit based speech recognition system and the memory, for indexing the one or more semantic units and storing the one or more indexed semantic units; and
a search engine, operatively coupled to the indexing and storage module and the memory, for searching the one or more indexed semantic units for a match with one or more semantic units associated with a user query, and for retrieving the stored audio based data based on the one or more indexed semantic units, wherein at least one segment of the stored audio-based data is retrievable by obtaining a location indicative of where the at least one segment is stored from a direct correspondence between at least one of the indexed semantic units and the at least one segment.

* * * * *